United States Patent
Shen et al.

(10) Patent No.: US 11,486,363 B2
(45) Date of Patent: Nov. 1, 2022

(54) BLADE TRANSPORT HOLDER

(71) Applicant: JIANGSU GOLDWIND SCIENCE & TECHNOLOGY CO., LTD., Jiangsu (CN)

(72) Inventors: Xingxing Shen, Jiangsu (CN); Zhu Zhang, Jiangsu (CN); Endi Zhai, Jiangsu (CN); Xingang Zhang, Jiangsu (CN)

(73) Assignee: JIANGSU GOLDWIND SCIENCE & TECHNOLOGY CO., LTD., Jiangsu (CN)

(*) Notice: Subject to any disclaimer, the term of this patent is extended or adjusted under 35 U.S.C. 154(b) by 475 days.

(21) Appl. No.: 16/613,076

(22) PCT Filed: Oct. 31, 2018

(86) PCT No.: PCT/CN2018/112867
§ 371 (c)(1),
(2) Date: Nov. 12, 2019

(87) PCT Pub. No.: WO2020/000823
PCT Pub. Date: Jan. 2, 2020

(65) Prior Publication Data
US 2021/0355918 A1    Nov. 18, 2021

(30) Foreign Application Priority Data
Jun. 28, 2018   (CN) .......................... 201810686559.2

(51) Int. Cl.
*F03D 13/40* (2016.01)

(52) U.S. Cl.
CPC .......... *F03D 13/40* (2016.05); *F05B 2260/02* (2013.01)

(58) Field of Classification Search
CPC ...... F03D 13/40; F05B 2260/02; Y02E 10/72; B60P 3/40; B60P 7/132; B60P 7/13
See application file for complete search history.

(56) References Cited

U.S. PATENT DOCUMENTS 4,303,283 A * 12/1981 Mueller .................... A47F 3/08
312/305
4,455,116 A * 6/1984 Lindstedt .............. E21B 19/146
175/52
(Continued)

FOREIGN PATENT DOCUMENTS

CH   207257716 U   4/2018
CN   101648539 A   2/2010
(Continued)

OTHER PUBLICATIONS

The International Search Report dated Mar. 28, 2019; PCT/CN2018/112867.
(Continued)

*Primary Examiner* — Ko H Chan

(57) ABSTRACT

A blade transport holder for supporting multiple blades is provided according to the present application. The blade transport holder includes a first support assembly and a second support assembly. The first support assembly includes a first support frame and a first support member rotatably arranged at the first support frame, and the first support member is configured to fix root portions of the multiple blades; the second support assembly includes a second support frame and a second support member rotatably arranged at the second support frame, the second support member faces the first support member, and the second support member is configured to fix tip portions of the multiple blades. With the blade transport holder according to the present application, multiple blades can be transported at one time by a single blade transport holder.

11 Claims, 2 Drawing Sheets

(56) References Cited

U.S. PATENT DOCUMENTS

| | | | | |
|---|---|---|---|---|
| 4,892,160 | A * | 1/1990 | Schivley, Jr. | E21B 19/146 |
| | | | | 175/85 |
| 5,297,642 | A * | 3/1994 | Rajakallio | E21B 19/146 |
| | | | | 175/85 |
| 5,556,064 | A * | 9/1996 | Cowe | F16M 11/24 |
| | | | | 248/172 |
| 5,954,209 | A * | 9/1999 | Wurm | E21B 19/15 |
| | | | | 175/85 |
| 9,802,525 | B2 * | 10/2017 | Gill, III | F16M 11/2021 |
| 10,843,614 | B1 * | 11/2020 | Hill | B23K 9/0282 |
| 2011/0131809 | A1 | 6/2011 | Riddell et al. | |
| 2011/0193349 | A1 | 8/2011 | Borgen | |
| 2013/0315685 | A1 | 11/2013 | Pedersen | |
| 2014/0050547 | A1 | 2/2014 | Hiremath et al. | |
| 2014/0248112 | A1 | 9/2014 | Ruijter et al. | |
| 2014/0305743 | A1 | 10/2014 | Poulsen et al. | |
| 2014/0356113 | A1 * | 12/2014 | Schmidt | F03D 13/40 |
| | | | | 414/800 |
| 2016/0053740 | A1 * | 2/2016 | Landrum | B61D 3/16 |
| | | | | 414/800 |
| 2017/0370346 | A1 | 12/2017 | Botwright et al. | |

FOREIGN PATENT DOCUMENTS

| | | |
|---|---|---|
| CN | 103419703 A | 12/2013 |
| CN | 104066974 A | 9/2014 |
| CN | 105179160 A | 12/2015 |
| CN | 205689659 U | 11/2016 |
| CN | 205280190 U | 6/2017 |
| CN | 107223184 A | 9/2017 |
| CN | 206519915 U | 9/2017 |
| CN | 107306110 A | 10/2017 |
| CN | 207292828 U | 5/2018 |
| EP | 2333315 A2 | 11/2010 |
| EP | 2808540 A1 | 5/2013 |
| EP | 2698530 A2 | 2/2014 |
| EP | 2772390 A2 | 2/2014 |
| EP | 2708731 A2 | 3/2014 |
| WO | 2017/114532 A1 | 7/2017 |

OTHER PUBLICATIONS

European Sereach Report dated Jun. 25, 2020; Application No. PCT/CN2018112867.

First Australian Office Action Application No. 2018414992; dated Aug. 4, 2020.

The First Chinese Office Action dated Mar. 25, 2019 Appln CN201810686559.2.

* cited by examiner

BLADE TRANSPORT HOLDER

CROSS REFERENCE TO RELATED APPLICATIONS

This application is the national phase of International Application No. PCT/CN2018/112867, titled "BLADE TRANSPORT HOLDER", filed on Oct. 31, 2018, which claims the benefit of priority to Chinese Patent Application No. 201810686559.2, titled "BLADE TRANSPORT HOLDER", filed with the China National Intellectual Property Administration on Jun. 28, 2018, the entire disclosures of which applications are incorporated herein by reference.

FIELD

The present application relates to the technical field of wind power generation, and in particular to a device capable of transporting multiple wind turbine blades at one time.

BACKGROUND

Offshore wind turbines gradually tend to be large megawatt models, diameters of the impellers are gradually increased, and the blades are getting longer and longer, which is a great challenge for marine transport of the blades. Large blades occupy a large space on the deck, and if the layout of the blades is unreasonable, it will result in waste of resources.

At present, large blades are generally transported by ships in China. During transportation, the blades are laid flatwise, and each blade employs separate transportation tooling, and each ship can only transport about three blades. Therefore, the transport ships are required to transport for multiple times, which results in an increase of transportation costs. In addition, a separate set of transportation tooling is required for each blade, which causes waste of transportation tooling resources, and thereby resulting in an increase of manufacturing costs. Therefore, a multiple-blade transport holder for transporting multiple blades at one time is required to be provided, to minimize the space, occupied by the blades, on the deck of the transportation ship, so as to maximally increase the number of the blades which can be transported.

SUMMARY

In view of the defects in the conventional technology, a first object of the present application is to solve one or more of the problems in the conventional technology described above. For example, the first object of the present application is to provide a device capable of transporting multiple blades at one time, and a second object of the present application is to provide a device for transporting and unloading the multiple blades to a position for lifting.

To achieve the first object, a blade transport holder for supporting multiple blades is provided according to the present application. The blade transport holder includes a first support assembly and a second support assembly. The first support assembly includes a first support frame and a first support member rotatably arranged at the first support frame, and the first support member is configured to fix root portions of the multiple blades. The second support assembly includes a second support frame and a second support member rotatably arranged at the second support frame, the second support member is arranged to face the first support member, and the second support member is configured to fix tip portions of the multiple blades. In a state in which the multiple blades are mounted at the blade transport holder, the first support member and the second support member are able to rotate synchronously.

Compared with the conventional technology, the advantages of the present application are as follows. Multiple blades can be transported at the same time; the blades can be chosen in a case that the blades are to be lifted, which reduces the transportation cost; the blades are prevented from being damaged when the connection between the blades and the blade transport holder are disassembled; and it is convenient for the lifting appliance to clamp the blades.

BRIEF DESCRIPTION OF THE DRAWINGS

The above and other objects and features of the present application will become more apparent through the following description in conjunction with the drawings.

DETAILED DESCRIPTION

Figure 1:
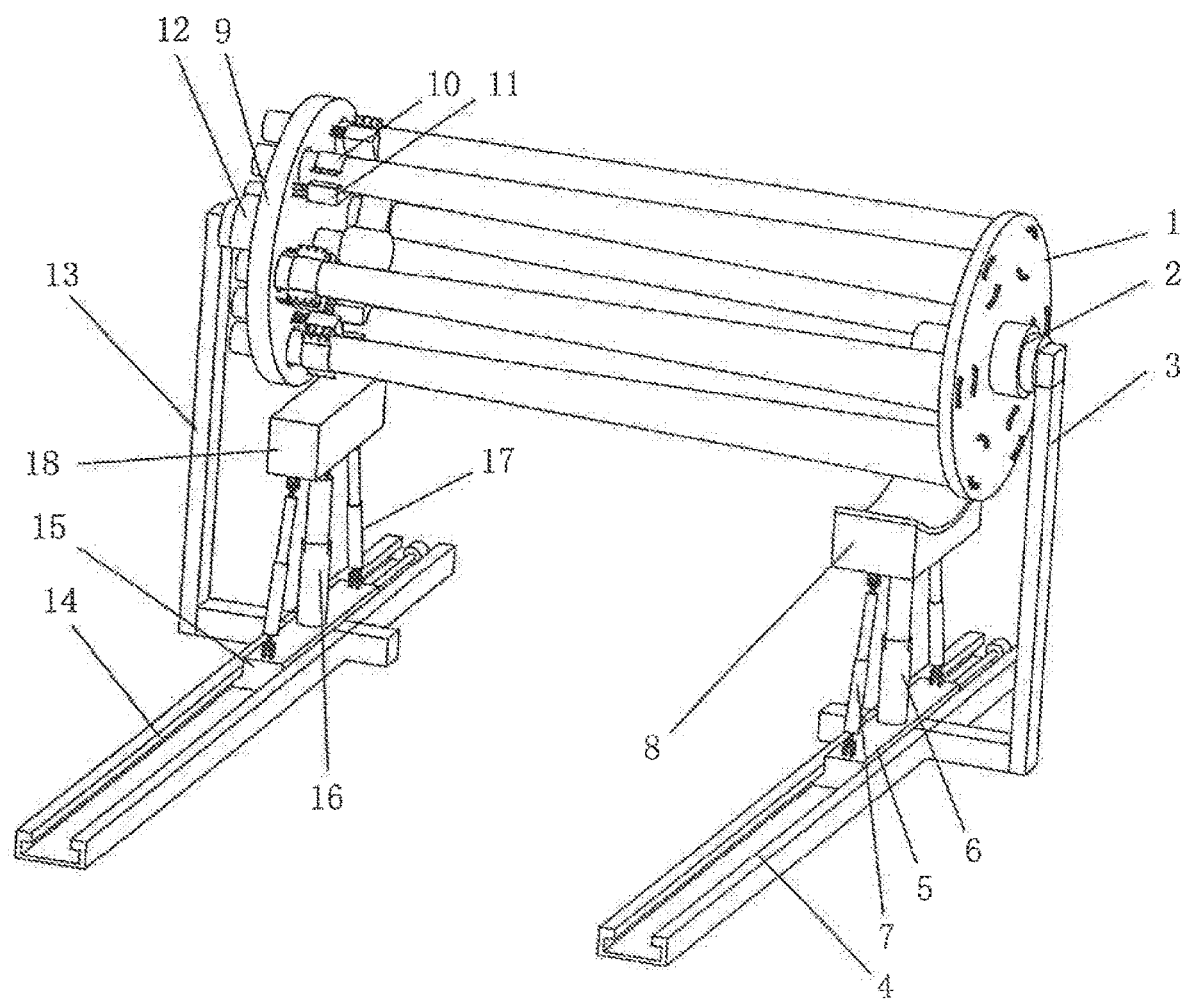
FIG. 1 is a perspective view of a blade transport holder according to an exemplary embodiment of the present application.

| Reference Numerals: | | | |
|---|---|---|---|
| 1 | first support member, | 2 | first bearing, |
| 3 | first support frame, | 4, 14 | guide rail, |
| 5, 15 | slide block, | 6, 7, 16, 17 | hydraulic cylinder, |
| 8, 18 | bottom base, | 9 | second support member, |
| 10 | upper cover plate, | 11 | lower cover plate, |
| 12 | second bearing, | 13 | second support frame, |
| 19, 25 | motor, | 20, 22 | universal joint, |
| 21 | blade, | 23, 24 | screw motor. |

Hereinafter, a blade transport holder according to the present application will be described in detail in conjunction with the drawings and an exemplary embodiment.

Figure 2:
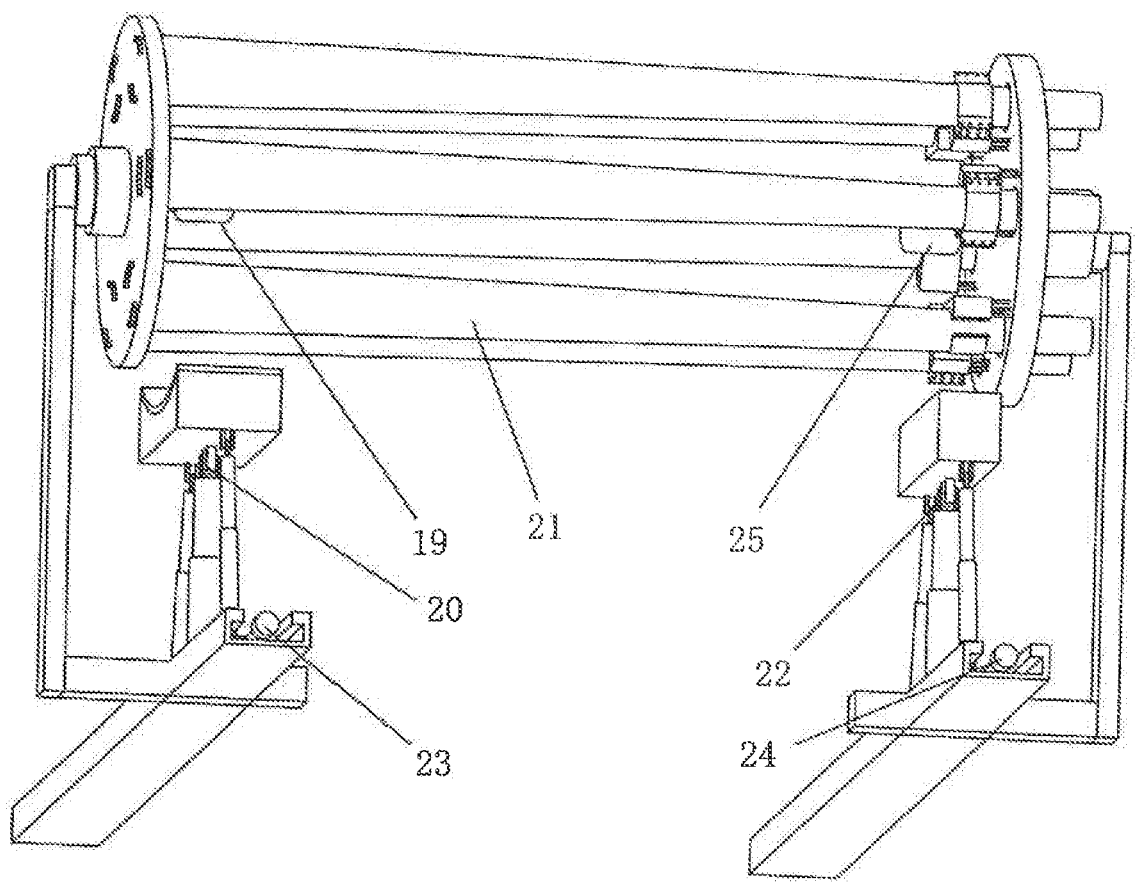
FIG. 2 is a perspective view of the blade transport holder from another perspective according to the exemplary embodiment of the present application.

FIG. 1 is a perspective view of a blade transport holder according to the exemplary embodiment of the present application; and FIG. 2 is a perspective view of the blade transport holder from another perspective according to the exemplary embodiment of the present application.

As shown in FIGS. 1 and 2, the blade transport holder according to the exemplary embodiment of the present application includes a first support assembly configured for supporting root portions of multiple blades when the blades are transported and a second support assembly configured for supporting tip portions of the multiple blades when the blades are transported. The first support assembly includes a first support frame 3 and a first support member 1 rotatably arranged at the first support frame 3, and the first support member 1 is configured to fix root portions of the multiple blades. The second support assembly includes a second support frame 13 and a second support member 9 rotatably arranged at the second support frame 13, the second support member 9 faces the first support member 1, and the second support member 9 is configured to fix tip portions of the multiple blades. In a state in which the multiple blades are mounted at the blade transport holder, the first support member 1 and the second support member 9 are able to rotate synchronously, preferably, the first support member 1 and the second support member 9 are able to rotate coaxially. In this way, multiple blades can be transported at one time by a single transport holder, moreover, in a case that a blade is to be disassembled from the blade transport holder, the blade may be chosen through rotation of the first support member 1 and the second support member 9.

In the embodiment, both the first support member 1 and the second support member 9 may be disc-shaped, and in the state in which the multiple blades are mounted at the blade transport holder, the multiple blades are arranged at intervals in a circumferential direction of the first support member 1 and the second support member 9. In FIGS. 1 and 2, six blades are shown, but the present application is not limited thereto, and the blade transport holder may be arranged to support other numbers of blades. Moreover, the first support member 1 and the second support member 9 may be of other shapes such as a regular shape like a rectangular shape or an oval shape, or an irregular shape. The embodiment will be described hereinafter by taking a blade 21 of the six blades as an example.

Since an end surface of a root portion of the blade 21 is provided with bolt holes in a circumferential direction, the first support member 1 and the end surface of the root portion of the blade 21 can be detachably connected by bolts.

A tip portion of the blade 21 is not provided with bolt holes, and in order to support the tip portion of the blade 21 without damaging the blade 21, a blade tip connecting member may be further provided. The blade tip connecting member is configured to couple with the tip portion of the blade 21 and is detachably connected to the second support member 9. In the embodiment, with reference to FIG. 1, the blade tip connecting member includes an upper cover plate 10 and a lower cover plate 11. The upper cover plate 10 has a surface matching an upper surface of the blade 21, to be fitted to the upper surface of the blade 21. The lower cover plate 11 has a surface matching a lower surface of the blade 21, to be fitted to the lower surface of the blade 21. After the upper cover plate 10 and the lower cover plate 11 are fitted to the blade 21, the upper cover plate 10 and the lower cover plate 11 may be connected together by bolts. Then, the lower cover plate 11 is connected to the second support member 9 by bolts. The blade tip connecting member is able to rotate together with the second support member 9. Moreover, preferably, the blade 21 can be hooped after the upper cover plate 10 and the lower cover plate 11 are coupled together.

In the embodiment, a through hole may be formed in the second support member 9, and an end portion of the tip portion of the blade 21 can pass through the through hole. The through hole may be arranged to have a large diameter, to make it easier for the tip portion of the blade 21 to pass through. In addition, the through hole may be formed by a recessed portion of an edge portion of the second support member 9 and a closing member (not shown) that closes the recessed portion. When the blade 21 is assembled to or disassembled from the second support member 9, the closing member is opened to make it easier for the tip portion of the blade 21 to pass through.

The first support member 1 is connected to the first support frame 3 via a first bearing 2, and the first support assembly may further include a first driving member configured for driving the first support member 1 to rotate with respect to the first support frame 3 through the first bearing 2. The second support member 9 is connected to the second support frame 13 via a second bearing 12, and the second support assembly may further include a second driving member configured for driving the second support member 9 to rotate with respect to the second support frame 13 through the second bearing 12. In the embodiment, the first driving member and the second driving member may be motors 19, 25, the motors 19, 25 drive the first support member 1 and the second support member 9 to rotate synchronously, so as to drive the six blades to rotate along with the first support member 1 and the second support member 9, while the first support frame 3 and the second support frame 13 are stationary with respect to each other. However, the present application is not limited thereto, and gear transmission may be employed to replace the motor driving.

In addition, for the current single-blade transport holder, a single-blade lifting appliance is required to clamp the blade first, and bolts at a blade root can be removed only after a force is applied to a main crane, so as to disassemble the blade from the transport holder. There is a certain risk in this way. Specifically, in the process of removing the bolts, since strength is sustained by the bolts, a clamping force of the single-blade lifting appliance may increase instantaneously due to rebound of the strength when the blade is suddenly disassembled, which is likely to cause damage to the blade. This is also a defect of the current blade transport mechanism, which is not beneficial to the mounting of the blade.

In order to avoid damage to the blade 21 when the blade 21 is disassembled from the transport holder, the blade transport holder may further include at least one bottom support unit, and the bottom support unit is arrange below a rotational axis of the first support member 1 and the second support member 9. When the blade 21 is disassembled from the transport holder, the blade 21 is supported by the bottom support unit and then the connection between the blade 21 and the transport holder is removed, to ensure that no external lifting force is required when the connection between the blade 21 and the transport holder is removed.

In the embodiment, the blade transport holder may further include a first bottom support unit close to the first support member 1 and a second bottom support unit close to the second support member 9, and each of the first bottom support unit and the second bottom support unit includes a bottom base 8, 18 and a height adjusting member. However, the present application is not limited thereto, and the number of the bottom support unit may be one or two or more. Moreover, a position at which the bottom support unit is arranged is not limited to a case shown in FIG. 1. For example, in a case that there is one bottom support unit, the bottom support unit may be arranged at an intermediate portion between the first support member 1 and the second support member 9. In a case that there are three or more bottom support units, the bottom support units may be sequentially arranged at intervals between the first support member 1 and the second support member 9. Regardless of the number of the bottom support units, each of the bottom support units may be provided with the above bottom base and height adjusting member.

As shown in FIG. 1, the bottom base 8 at a blade root has a contact surface that matches a surface of the root portion of the blade 21. The bottom base 18 at a blade tip has a contact surface that matches a surface of the tip portion of the blade 21 or a surface of the blade tip connecting member. In the embodiment, an upper surface of the bottom base 8 at the blade root is arc-shaped, and a cross section of the bottom base 8 is C-shaped. In the embodiment, since the contact surface between the lower cover plate 11 of the blade tip connecting member and the bottom base 18 at the blade tip is flat, an upper surface of the bottom base 18 at the blade tip may be flat. In a case that the blade 21 is disassembled from the transport holder, instead of disassembling connecting bolts after the single-blade lifting appliance clamps the blade and applies forces to the blade, the connection between the blade 21 and the transport holder is removed after the blade 21 is completely laid on the bottom bases 8, 18, which greatly reduces the risk of damage to the blade.

The height adjusting member can be used to adjust positions of the bottom bases 8, 18 in a vertical direction, which may be embodied as hydraulic cylinders 6, 16 arranged in the vertical direction, that is, a hydraulic lift cylinder 6 at the blade root and a hydraulic lift cylinder 16 at the blade tip. However, the present application is not limited thereto, and a lift chain may be employed to replace the hydraulic lift cylinder. The height adjusting member can raise or lower a height of the bottom bases 8, 18, so that the bottom bases 8, 18 can be fitted to the surface of the blade 21, to provide support for the blade 21. In addition, since there is a certain requirement on a clearance height below the blade 21 when the single-blade lifting appliance is used to clamp the blade, and the clearance height of about 2 m is generally required, the height adjusting member can also raise or lower the bottom bases 8, 18, to ensure that the clearance height below the blade 21 satisfies the clamping requirement of the single-blade lifting appliance. Tooling such as a raising block or Bailey truss are not required, and the blade 21 is also not required to be transported again to the raising block or the Bailey truss, which reduces both the development costs of the tooling and the mounting time.

The bottom support unit may further include an angle adjusting member configured for adjusting an angle of the bottom base 8, 18, and the angle adjusting member is arranged at the slide block 5, 15. The angle adjusting member includes a hydraulic cylinder 7, 17 arranged obliquely and an universal joint 20, 22 arranged between the bottom base 8, 18 and the height adjusting member. In the embodiment, the bottom base 8 at the blade root is connected to the hydraulic lift cylinder 6 at the blade root via the universal joint 20, and is connected to the hydraulic cylinder 7 by bolts. The bottom base 18 at the blade tip is connected to the hydraulic lift cylinder 16 at the blade tip via the universal joint 22, and is connected to the hydraulic cylinder 17 by bolts. Since the single-blade lifting appliance has a special requirement on an angle of the blade 21 when clamping the blade 21, if a bottom base of the single-blade lifting appliance cannot be completely fitted to the surface of the blade 21 during clamping, the angle of the blade 21 can be adjusted left and right by the hydraulic cylinders 7 and 17 at the two sides, to allow the bottom base of the single-blade lifting appliance to be completely fitted to the surface of the blade 21, and thereby avoiding adjusting the position of the single-blade lifting appliance back and forth or changing the angle of the blade 21 by using a crosstie.

Each of the first bottom support unit and the second bottom support unit may further include a moving member, and the moving member is connected to the height adjusting member to transport the bottom base 8, 18 to a predetermined position, which may be a position that can provide sufficient space for the blade lifting appliance to clamp the blade 21. In the embodiment, the moving member may include a guide rail 4, 14 and a slide block 5, 15. The guide rail 4, 14 is arranged below the bottom base 8, 18, and the slide block 5, 15 is connected to the height adjusting member and is slidable on the guide rail 4, 14.

Specifically, the guide rail 4 is connected to the first support frame 3 and supported on a deck of a ship or the ground, to support the entire blade transport holder. The slide block 5 is mounted on the guide rail 4, and the slide block 5 is connected to the hydraulic cylinder 6 and the hydraulic cylinder 7. The slide block 5 can be driven to move on the guide rail 4 by a screw motor 23.

The guide rail 14 is connected to the second support frame 13 and supported on the deck of the ship or the ground, to support the entire blade transport holder. The slide block 15 is mounted on the guide rail 14, and the slide block 15 is connected to the hydraulic cylinder 16 and the hydraulic cylinder 17. The slide block 15 can be driven to move on the guide rail 14 by a screw motor 24.

The slide block 5 is mounted on the guide rail 4, and the slide block 15 is mounted on the guide rail 14. The slide block 5 and the slide block 15 are driven by the screw motor 23 and the screw motor 24, respectively, to drive the bottom base 8 and the bottom base 18 to move outward along the guide rail 4 and the guide rail 14, to allow the blade 21 to get away from the entire transport holder, so as to provide sufficient space for the single-blade lifting appliance to directly clamp the blade 21, and the blade is not required to be transported again. However, the present application is not limited thereto, and gear and rack transmission may be employed to replace the screw transmission.

A process of transporting multiple blades (a case of six blades is taken as an example) by using the above blade transport holder will be described in detail hereinafter, and the steps are as follows.

S1, six blades are mounted at the blade transport holder.

S2, the blade transport holder carrying the six blades is transported to a position of the wind turbine by a transport ship, and the entire blade transport holder together with the six blades are transported a mounting ship by a main crane of the mounting ship.

S3, the motor 19 and the motor 25 synchronously drive the first support member 1 and the second support member 9 to rotate, and rotation is stopped when the blade 21 to be mounted is rotated to a lowermost position of the first support member 1 and the second support member 9.

S4, the bottom base 8 and the bottom base 18 are raised by the hydraulic cylinder 6 and the hydraulic cylinder 16, respectively, so that the bottom base 8 is fitted to a lower surface of the blade root of the blade 21, and the bottom base 18 is fitted to the surface of the lower cover plate 11 at the blade tip of the blade 21, at this time, all the weight of the blade 21 is sustained by the bottom base 8 and the bottom base 18.

S5, connecting bolts between the end surface of the blade root of the blade 21 and the first support member 1 are removed, and connecting bolts between the lower cover plate 11 of the blade and the second support member 9 are removed.

S6, the slide block 5 and the slide block 15 are driven by the screw motor 23 and the screw motor 24, respectively, to move along the guide rail 4 and the guide rail 14, to allow the blade 21 to get away from the blade transport holder. When the blade 21 moves to a position that there is enough space for the single-blade lifting appliance to clamp the blade 21, the movement is stopped.

S7, according to the requirement of the clearance height for the single-blade lifting appliance to clamp the blade 21, the hydraulic cylinder 6 and the hydraulic cylinder 16 moves, to raise the blade 21 to a designated height, so as to make it easier for the single-blade lifting appliance to directly clamp the blade 21. In a case that a shape of the bottom base of the single-blade lifting appliance is not fitted to the shape of the surface of the blade 21, the angle of the blade 21 may be adjusted left and right by the hydraulic cylinder 7 and the hydraulic cylinder 17, so that the blade 21 can be fitted to the bottom base of the single-blade lifting appliance. After the single-blade lifting appliance clamps the blade 21, the blade 21 can be directly lifted and mounted.

According to the present application, multiple blades can be transported at one time by a single blade transport holder, which reduces waste of transport ship resources, reduces transportation costs, and the blades can be chosen by rotating the transport holder. In addition, the transport holder can provide auxiliary functions for single blade lifting, which is described as follows.

1. The transport holder includes a bottom base, so that the connecting bolts between the blade and the transport holder can be removed without the requirement of the external lifting force.

2. The bottom base of the transport holder can move in a radial direction of the transport holder, to get away from the body of the transport holder, so that the single-blade lifting appliance can directly clamp the blade.

3. The bottom base of the transport holder has a lifting function, and the clearance height of the blade can be adjusted by the hydraulic lift cylinder, to satisfy the requirement of the clearance height for the single-blade lifting appliance to clamp the blade.

4. The bottom base of the transport holder has a left and right adjustment function, and the angle of the blade can be adjusted by left and right adjustment of the hydraulic cylinder, to allow the surface of the blade can be completely fitted to the surface of the bottom base of the single-blade lifting appliance.

The present application has been described hereinbefore in conjunction with the exemplary embodiments. Those skilled in the art may understand that, various modifications and improvements may be made to the exemplary embodiments of the present application without departing from the principle and scope of the present application defined by the claims.

The invention claimed is:

1. A blade transport holder for supporting a plurality of blades, comprising a first support assembly and a second support assembly, wherein the first support assembly comprises a first support frame and a first support member rotatably arranged at the first support frame, and the first support member is configured to fix root portions of the plurality of blades;

the second support assembly comprises a second support frame and a second support member rotatably arranged at the second support frame, the second support member is arranged to face the first support member, and the second support member is configured to fix tip portions of the plurality of blades; and wherein in a state in which the plurality of blades are mounted at the blade transport holder, the first support member and the second support member are synchronously rotatable, wherein the bottom support unit is arranged below a rotational axis of the first support member and the second support member, wherein the at least one bottom support unit comprises a first bottom support unit close to the first support member and a second bottom support unit close to the second support member, and each of the first bottom support unit and the second bottom support unit comprises:

a bottom base configured for supporting one of the plurality of blades; and a height adjusting member configured for adjusting a position of the bottom base in a vertical direction.

2. The blade transport holder according to claim 1, wherein both the first support member and the second support member are disc-shaped, and in the state in which the plurality of blades are mounted at the blade transport holder, the plurality of blades are arranged at intervals in a circumferential direction of the first support member and the second support member.

3. The blade transport holder according to claim 1, wherein the height adjusting member comprises a hydraulic cylinder arranged in the vertical direction.

4. The blade transport holder according to claim 1, wherein each of the first bottom support unit and the second bottom support unit further comprises a moving member, and the moving member is connected to the height adjusting member, to transport the bottom base to a predetermined position.

5. The blade transport holder according to claim 4, wherein the moving member comprises:

a guide rail arranged below the bottom base; and a slide block connected to the height adjusting member, and the slide block is slidable on the guide rail.

6. The blade transport holder according to claim 5, wherein each of the first bottom support unit and the second bottom support unit further comprises an angle adjusting member configured for adjusting an angle of the bottom base, and the angle adjusting member is arranged at the slide block.

7. The blade transport holder according to claim 6, wherein the angle adjusting member comprises a hydraulic cylinder arranged obliquely, and an universal joint arranged between the bottom base and the height adjusting member.

8. The blade transport holder according to claim 1, further comprising blade tip connecting members, each of the blade tip connecting members is configured to couple with a tip portion of a corresponding blade of the plurality of blades, and the blade tip connecting members are detachably connected to the second support member.

9. The blade transport holder according to claim 8, wherein through holes are formed in the second support member, and an end portion of a tip portion of each of the plurality of blades is allowed to pass through a corresponding through hole.

10. The blade transport holder according to claim 1, wherein the first support member is detachably connected to end surfaces of root portions of the plurality of blades.

11. The blade transport holder according to claim 1, wherein the first support member is connected to the first support frame through a first bearing, and the second support member is connected to the second support frame through a second bearing;

the first support assembly further comprises: a first driving member configured for driving the first support member to rotate with respect to the first support frame through the first bearing; and the second support assembly further comprises: a second driving member configured for driving the second support member to rotate with respect to the second support frame through the second bearing.

* * * * *